Patented Feb. 23, 1937

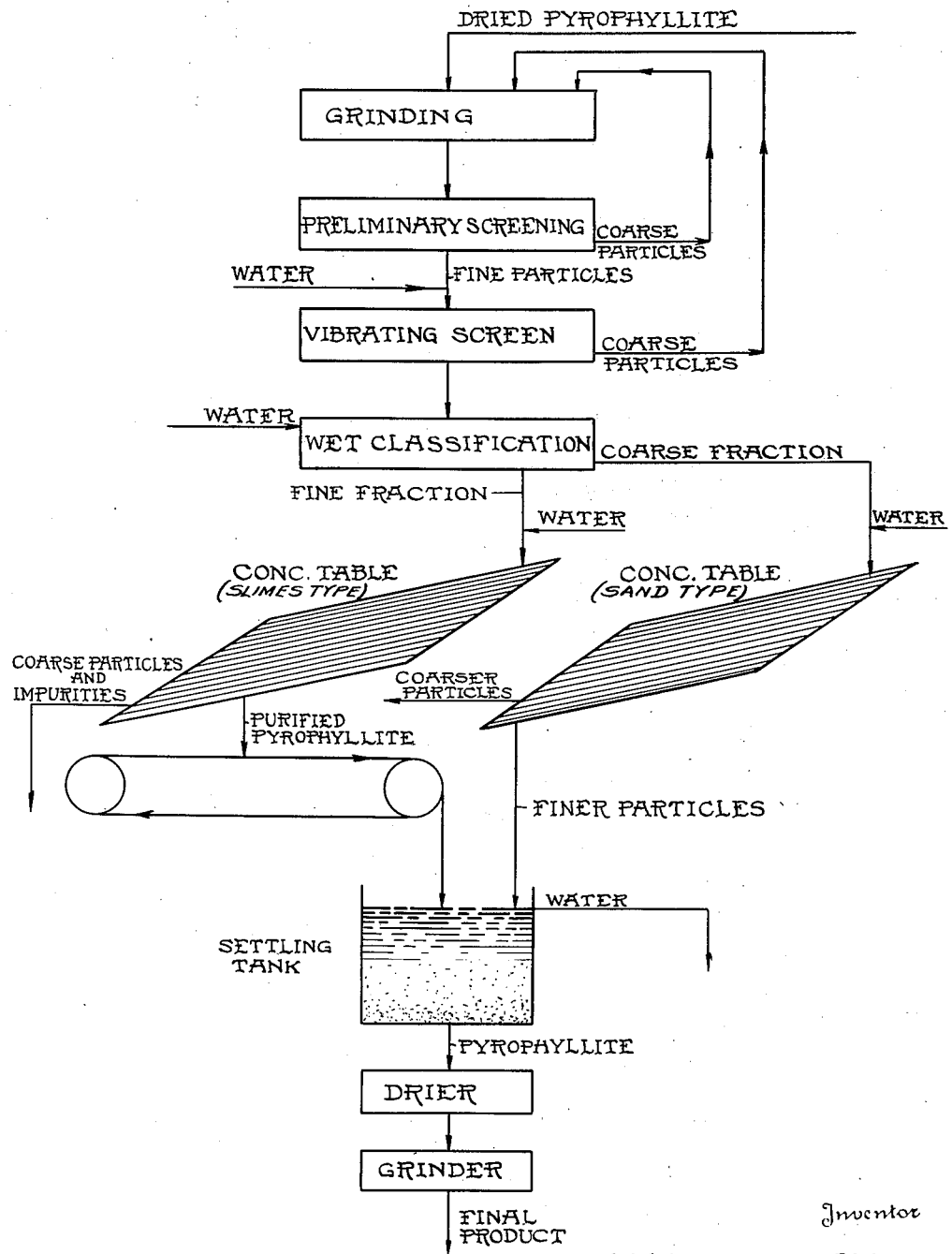

2,072,063

UNITED STATES PATENT OFFICE 2,072,063

MANUFACTURE OF PYROPHYLLITE

William H. Alton, New York, N. Y., assignor to R. T. Vanderbilt Company, Incorporated, New York, N. Y., a corporation of New York Application September 30, 1933, Serial No. 691,734

2 Claims. (Cl. 209—2)

This invention relates to the manufacture of purified pyrophyllite from the impure crude or raw pyrophyllite, whereby the pyrophyllite is made available in a purified state for satisfactory use in ceramic wares, toilet preparations, plastic paints, and for polishing and finishing purposes, etc.

Pyrophyllite, as mined, has impurities interspersed throughout the mass, such as silica crystals, varying forms of iron such as sulfides and silicates, and other metal compounds. These impurities occur in minute specks or in particles of varying size.

Much effort has been expended in attempts to separate the excess of free silica, and the mineral and organic impurities, from the raw pyrophyllite, but it has been difficult or impossible by the methods heretofore proposed to effect the satisfactory separation of the various impurities which tend to be carried along with the pyrophyllite particles during the separation treatment.

The impurities present in pyrophyllite are objectionable and prevent or limit its use for various purposes. When the pyrophyllite is ground and the impurities are ground with it, the interspersion of the impurities throughout the pyrophyllite mass prevents the pyrophyllite from use in making white pottery because the impurities give the pottery a dark or speckled appearance. When a very finely pulverized pyrophyllite is required for use for toilet purposes or in the finishing of white textile goods or in making oil or plastic paints, etc., the black or dark particles are ground with the pyrophyllite and impart a grayish tint to the fine product, while the free silica crystals present cause an abrasive or irritating action if the powder is used as a face powder.

The difficulty in separating the impurities arises from the fact that they are of about the same weight as the pyrophyllite and include both magnetic and non-magnetic material so that they cannot readily be separated through magnetic treatment.

I have found that the dried and ground pyrophyllite can be satisfactorily purified and an almost perfect separation of impurities can be obtained by grinding the pyrophyllite so that it will all pass through a suitable sieve with e. g. quarter inch openings, then mixing the ground pyrophyllite with enough water to make a slurry of suitable consistency so that it can be pumped, screening the material to remove coarser particles which need regrinding, for example, on a vibrating screen having from 10 to 25 meshes to the inch, classifying the resulting fine material into finer and coarser fractions and passing these fractions over classifying tables whereby the purified pyrophyllite is separated from the impurities, and then drying the purified material, e. g. in a rotary or spray drier.

The pyrophyllite as mined should be dried, if it contains water, and should be crushed to a size permitting it to be handled. The preliminary treatment of mining, drying and crushing can be carried out in any suitable manner to provide a dried crushed product of sufficient fineness for treatment according to the process. The preliminary screening of the material removes the coarser particles which are returned for further grinding, so that only particles of sufficient fineness, and containing the impurities physically separated as fine particles from the fine particles of pyrophyllite, are subjected to the present process. The coarser material which is separated by the preliminary screening is further ground to reduce it to the proper fine size.

The preliminary ground material to e. g. quarter inch size or smaller and mixed with enough water to make a slurry of suitable consistency for pumping, can be pumped to an elevated vibrating screen located e. g. at a level of from 10 to 20 feet, and the coarser material, that stays on the screen, can be returned by gravity to the ground level for regrinding and combined with material to be subsequently returned to the vibrating screen.

The material fine enough to pass the vibrating screen, i. e. passing through a screen of from say 10 to 25 meshes to the inch, is subjected to wet classification after dilution with additional water so that it can be separated into fractions containing the finer particles and fractions containing the coarser particles of the pyrophyllite and impurities. The classifying separator may be of the "bowl" type such as made by the Dorr Company or of the classifying "cone" type such as made by the James Ore Concentrating Company. In such a classification treatment, all material finer than, for example, 100 mesh, can be classified in the finer fractions, and all material between e. g. 20 mesh and 100 mesh can be classified in a coarser fraction. More than two fractions can be prepared, but the two fractions just mentioned are typical.

The finer fraction, containing particles of around 100 mesh or finer, is subjected to a wet table concentration on a table of the "slime" type; while the coarser fraction above mentioned and containing e. g. material between 20 and 100 mesh, is subjected to concentration on a concentrating table of the "sand table" type. These tables are well known concentrating tables such as have been used for the concentration of free milling gold ore and may have, for example, a "deck" or table about 15 feet long by 6 feet wide mounted on rocker bearings and oscillated or vibrated by suitable vibrating mechanism and with a suitable stroke of e. g. one-half inch. Such tables are not level but have a pitch or slant both sideways and lengthwise. The top of the table is covered with a suitable material such as linoleum, and on top of this material are placed thin and narrow strips of wood varying in distance of separation one from the other according to the desired separation but always running parallel to the length of the table.

The slurry of fine pyrophyllite, impurities and water, is run on to the table in the proportion of about 600 to 1000 gallons of water per ton of material on the coarse or sand table product and about 300 to 500 gallons of water per ton of material for the fine slime table product. The slurry is discharged on to the table from the top side and flows from the top side to the bottom side carrying with it the lighter particles of material and the larger particles which offer more area to the flow of water. Currents of water are supplied in the usual way. The heavier particles of impurities settle into the spaces between the riffles and the oscillating motion of the table carries them along between these riffles to the end of the table so that the impurities are discharged from the end of the table whereas the purified pyrophyllite is discharged from the lower side of the table. This operation is the reverse of that which occurs in the purification of minerals where the desired mineral product is recovered at the end of the table and the waste or discard material is discharged at the lower side.

With proper grinding and classification of the pyrophyllite a single table treatment will ordinarily be sufficient; but further or repeated treatment can be used where a single treatment does not sufficiently purify the pyrophyllite from impurities.

The refined pyrophyllite is collected from the lower side of the table, for example, on a traveling belt, and carried to settling tanks where the supernatant water can be drawn off after which the purified pyrophyllite can be dried in any suitable type of drier, and can be ground, either before or after drying, to any desired particle size, depending upon its intended use.

The drying of the purified pyrophyllite can advantageously be carried out by spray drying, sufficient water being left with the pyrophyllite to permit it to be pumped into a spray tower in which the water is evaporated, and from the bottom of which the dried product is recovered. The drying can also advantageously be carried out in a drier of the rotary type.

The grinding of the purified pyrophyllite can be carried out before drying and by wet grinding in a suitable mill, such as a ball mill. The spray drying of such a product has the advantage that it does not aggregate the fine particles, or to the extent that they may be aggregated during spray drying, they are readily separated in the spray dried product. Where the purified pyrophyllite is dried before grinding, it can be ground in a dried state to the desired particle size which in some cases, for example, may be to a size such that all or practically all of the purified pyrophyllite will pass through a 200 mesh screen, since pyrophyllite in this fine size has advantages for various purposes.

The accompanying drawing is a flowsheet representing the various steps of the process as described above.

The pyrophyllite purified by the present process is a valuable material for ceramic purposes. It naturally contains about the right proportions of silica and alumina, and its use makes possible the production of ceramic products which can be fired to a beautiful white color. The material is therefore a valuable compounding material for use in ceramic products such as wall tile, sanitary ware, glazes, and various pottery articles and bodies, etc. Ceramic products can thus be made which are free from the objectionable dark color or spotty appearance which results from the use of the unpurified or insufficiently purified pyrophyllite.

The purified product is also a valuable product for use in toilet preparations, such as face powders, etc.; and also for use in the finishing of white textile goods, in plastic and oil paints, in the polishing of rice, and for various other purposes. The purified material is a valuable substitute for imported French and Italian talc such as have heretofore been used in cosmetics and other preparations.

One of the important advantages presented by the present process is that it enables the entire purifying or refining treatment to be carried out in a wet way, thus eliminating all dust and danger of silicosis on the part of the workmen and operators.

I claim:

1. The method of purifying pyrophyllite which comprises preliminarily grinding the same and passing the ground material through a suitable screen such as a screen with ¼ inch openings, returning the larger particles for further grinding, forming the finer product into a slurry and screening the same through a screen of around 15 to 20 meshes to the inch, returning the oversize particles from such screening treatment for further grinding, classifying the finer particles from such screening treatment by wet classification into finer and coarser particles, such as particles finer and coarser than about 80 or 100 mesh, passing the finer fraction in the form of a slurry on to a concentrating table of the "slimes" type, using water in the proportion of about 300 to 500 gallons per ton of material, subjecting the coarser fraction to wet table concentration on a table of the "sand table" type with about 600 to 1000 gallons of water per ton of material, and drying the resulting purified pyrophyllite.

2. The method of purifying pyrophyllite which comprises preliminarily grinding and classifying the same into finer and coarser products, further classifying the finer product by wet classification into finer and coarser fractions, forming the finer fraction into a slurry, subjecting the coarser fraction to wet-table concentration on a table of the "sand" type, using water in the proportion of about 600 to 1000 gallons per ton of material, treating the slurry of the finer fraction on a concentration table of the "slimes" type, using an amount of water substantially less than that used on the "sand" table.

W. H. ALTON.